(12) United States Patent
Kim et al.

(10) Patent No.: US 8,942,307 B2
(45) Date of Patent: Jan. 27, 2015

(54) ANTENNA SWITCHING APPARATUS BASED ON SPATIAL MODULATION

(71) Applicants: Electronics and Telecommunications Research Institute, Daejeon (KR); Foundation for Research and Business Seoul National University of Science and Technology, Seoul (KR)

(72) Inventors: Bong-Su Kim, Daejeon (KR); Kwang Seon Kim, Daejeon (KR); Min Soo Kang, Daejeon (KR); Woo Jin Byun, Daejeon (KR); Hung Chul Park, Seoul (KR)

(73) Assignees: Electronics and Telecommunications Research Institute, Daejeon (KR); Foundation for Research and Business Seoul National University of Science and Technology, Seoul (KR)

( * ) Notice: Subject to any disclaimer, the term of this patent is extended or adjusted under 35 U.S.C. 154(b) by 0 days.

(21) Appl. No.: 13/912,752

(22) Filed: Jun. 7, 2013

(65) Prior Publication Data

US 2014/0254726 A1    Sep. 11, 2014

(30) Foreign Application Priority Data

Mar. 7, 2013    (KR) ........................ 10-2013-0024578

(51) Int. Cl.
*H04B 7/02*    (2006.01)
*H04B 7/04*    (2006.01)
*H01Q 21/00*    (2006.01)

(52) U.S. Cl.
CPC ......... *H04B 7/0413* (2013.01); *H01Q 21/0006* (2013.01)

USPC ............ 375/267; 375/260; 375/265; 375/316

(58) Field of Classification Search
CPC .... H04B 7/0671; H04B 7/0413; H04B 7/024; H04B 17/00; H04B 1/44; H04B 7/0602; H04B 7/0604; H04L 5/0007
USPC .......... 375/267, 260, 262, 316; 370/203, 204, 370/208, 209
See application file for complete search history.

(56) References Cited

U.S. PATENT DOCUMENTS

| | | |
|---|---|---|
| 7,826,574 B2 | 11/2010 | Wu et al. |
| 8,036,711 B2 | 10/2011 | Catreux-Erceg et al. |
| 8,094,743 B2 | 1/2012 | Ahn et al. |
| 8,520,748 B2 * | 8/2013 | Hamaguchi et al. .......... 375/260 |
| 2004/0152415 A1 * | 8/2004 | Anagnos ......................... 455/25 |

FOREIGN PATENT DOCUMENTS

KR    2006-0022630 A    3/2006

* cited by examiner

*Primary Examiner* — Dhaval Patel
(74) *Attorney, Agent, or Firm* — Ladas & Parry LLP

(57) ABSTRACT

An antenna switching apparatus based on spatial modulation includes a plurality of antennas; a control signal generator configured to generate a plurality of switching control signals; and a plurality of switches configured to switch on to apply a transmission signal to the respective antennas according to the respective switching control signals. Further, the antenna switching apparatus includes a delay analyzer configured to receive the transmission signal output from each of the plurality of switches to calculate delay information for synchronizing the switching control signals applied to the respective switches; and a delay adjuster configured to synchronize the switching control signals to apply the synchronized switching control signals to the respective switches according to the calculated delay information.

14 Claims, 3 Drawing Sheets

ANTENNA SWITCHING APPARATUS BASED ON SPATIAL MODULATION

CROSS-REFERENCE TO RELATED APPLICATION(S)

The present invention claims priority of Korean Patent Application No. 10-2013-0024578, filed on Mar. 7, 2013, which is incorporated herein by reference.

FIELD OF THE INVENTION

The present invention relates to antenna switching technology based on spatial modulation, and more particularly, to an antenna switching apparatus based on spatial modulation which can minimize signal distortion caused by desynchronization of a switching time between antennas.

BACKGROUND OF THE INVENTION

Recently, as wireless communication technology is advanced and equipment enabling the use of a wireless Internet service is widely distributed, an amount of used data increases. As the amount of used data increases, insufficiency of frequencies is coming to the fore as a great problem. To solve this problem, various technologies are being developed, and for example, may include high-order modulation technology, multiple-input multiple-output (MIMO) technology, signal separation technology using a polarized wave, etc.

However, in actually applying the technologies to a wireless communication system, there are problems such as a distance limitation between antennas, interference between signals, a complexity of implementation, etc. To solve the problems, proposed was a spatial modulation scheme that enhances frequency efficiency by using spatial information on a transmission antenna.

To describe an operation of a general spatial modulation scheme, before data is output to an antenna, the general spatial modulation scheme performs an operation that selects a specific antenna from among a plurality of antennas to effect switching. At this time, different delays can occur between switching signals used to determine whether to use the antennas. Due to such delays, discontinuity occurs between reception signals which are received and combined by a receiving end, and can cause serious signal distortion.

SUMMARY OF THE INVENTION

In view of the above, the present invention provides an antenna switching apparatus based on spatial modulation which receives and analyzes signals, output from respective switches connected to a plurality of antennas, to adjust delay times of respective switching control signals applied to the switches, thus minimizing signal distortion caused by desynchronization of a switching time between the antennas.

In accordance with an embodiment of the present invention, there is provided an antenna switching apparatus based on spatial modulation. The antenna switching apparatus includes a plurality of antennas; a control signal generator configured to generate a plurality of switching control signals; a plurality of switches installed at respective front stages of the plurality of antennas, and configured to switch on to apply a transmission signal to the respective antennas according to the respective switching control signals; a delay analyzer configured to receive the transmission signal output from each of the plurality of switches to calculate delay information for synchronizing the switching control signals applied to the respective switches; and a delay adjuster configured to synchronize the switching control signals to apply the synchronized switching control signals to the respective switches according to the calculated delay information.

Further, the delay analyzer may comprise a combiner configured to combine the transmission signals output from the respective switches; a receiver configured to down-converter the combined transmission signal; a filter configured to extract only a noise signal from the down-converted signal; and a delay controller configured to calculate delay information on the basis of the noise signal output from the filter, and supply the delay information to the delay adjuster Further, the receiver may convert the combined transmission signal into an IF band signal, and supplies the IF band signal to the filter.

Further, the filter may be a notch filter.

Further, the receiver may convert the combined transmission signal into a baseband signal, and may supply the baseband signal to the filter.

Further, the filter may be a high-pass filter.

Further, the delay adjuster may comprise a plurality of delay lock loops (DLLs) connected to the respective switches, and may be configured to adjust delay of the switching control signals to be input to the respective switches according to the delay information.

The present invention analyzes the signals output from the respective switches to differently set delays of the switching control signals, thus minimizing signal distortion caused by desynchronization of a switching time between the antennas.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

In the following description, when the detailed description of the relevant known function or configuration is determined to unnecessarily obscure the important point of the present invention, the detailed description will be omitted. Further, terms used herein are terms that have been defined in consideration of functions in embodiments, and the terms that have been defined as described above may be altered according to the intent of a user or operator, or conventional practice, and thus, the terms should be defined on the basis of the entire content of this specification.

Hereinafter, embodiments of the present invention will be described in detail with reference to the accompanying drawings.

Figure 1:
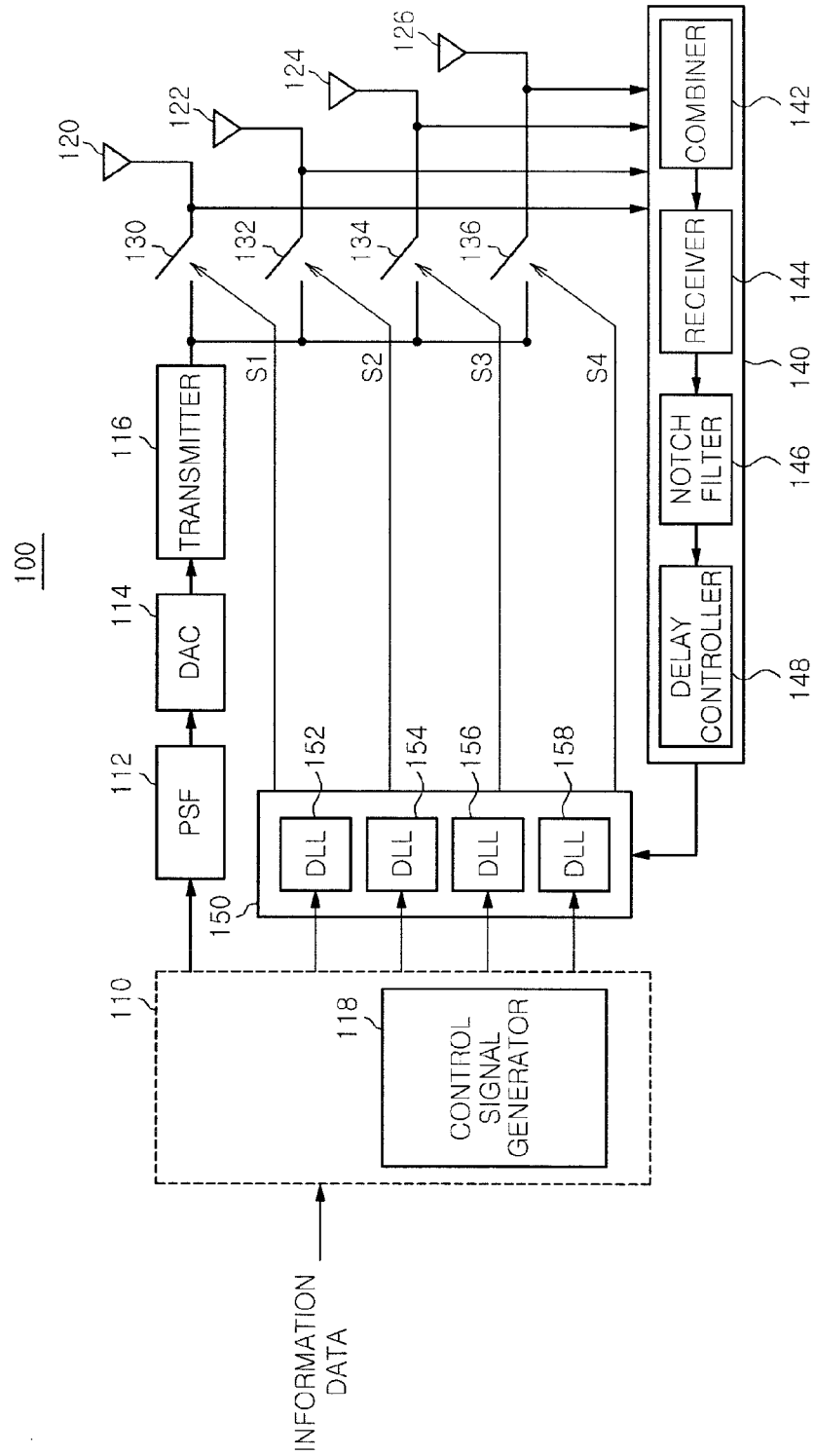
FIG. 1 is a circuit diagram illustrating a transmission apparatus based on spatial modulation in accordance with an embodiment of the present invention.

FIG. 1 is a circuit diagram illustrating a transmission apparatus based on spatial modulation in accordance with an embodiment of the present invention. That is, FIG. 1 is a circuit diagram a detailed structure for synchronization using a single chain intermediate frequency (IF) scheme.

A transmission apparatus 100 shown in FIG. 1 may include a de-multiplexer 110 that receives information data, a pulse shaping filter (FSF) 112, a digital-to-analog converter (DAC) 114, a transmitter 116, a control signal generator 118, a plurality of antennas 120, 122, 124 and 126, a plurality of switches 130, 132, 134 and 136 respectively connected to the antennas 120, 122, 124 and 126, a delay analyzer 140 that receives transmission signals output from the respective antennas 120, 122, 124 and 126, and a delay adjuster 150 that controls switching operations of the respective switches 130, 132, 134 and 136 on the basis of information analyzed by the delay analyzer 140.

The transmission apparatus 100 selects one antenna from among the plurality of antennas 120, 122, 124 and 126 according to a switching control signal generated by the control signal generator 118, and transmits the information data through the selected antenna. Here, the information data is transferred to the DAC 114 through the PSF 112, converted into an analog signal by the DAC 114, and input to the transmitter 116, whereupon the transmitter 116 transmits the analog signal to the outside through the selected antenna.

Figure 2:
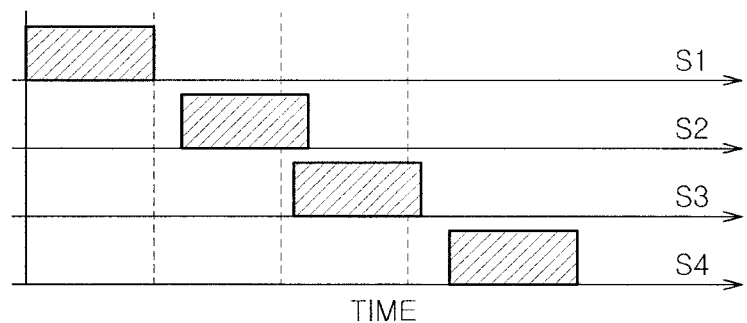
FIG. 2 is a diagram for describing a plurality of switching control signals in accordance with an embodiment of the present invention.

A plurality of switching control signals S1 to S4 generated by the control signal generator 118, as shown in FIG. 2, may not be synchronized with each other due to switching delay. To compensate for this, in an embodiment of the present invention, the delay analyzer 140 may analyze the transmission signals to be output to the respective antennas 120, 122, 124 and 126 to calculate delay information.

In an embodiment of the present invention, the delay analyzer 140 may analyze signals output from the respective switches 130, 132, 134 and 136 to calculate delay information, namely, delay times of the respective switching control signals applied to the plurality of switches 130, 132, 134 and 136. The calculated delay times are input to the delay adjuster 150.

The delay analyzers 140 may include: a combiner 142 that is connected to front ends of the respective antennas 120, 122, 124 and 126, and combines the signals output from the respective switches 130, 132, 134 and 136; a receiver 144 that down-converts the combined signal into a signal of an intermediate frequency (IF) band, and outputs the IF band signal; a notch filter 146 that removes signals other than a noise signal from the down-converted signal; and a delay controller 148 that calculates delay information on a switching control signal whose noise amplitude is minimized, using the noise signal output from the notch filter 146.

In the delay analyzer 140, it has been described above as an example that the IF band signal is used as an input signal of the delay controller 148, but a baseband signal may be used.

Figure 3:
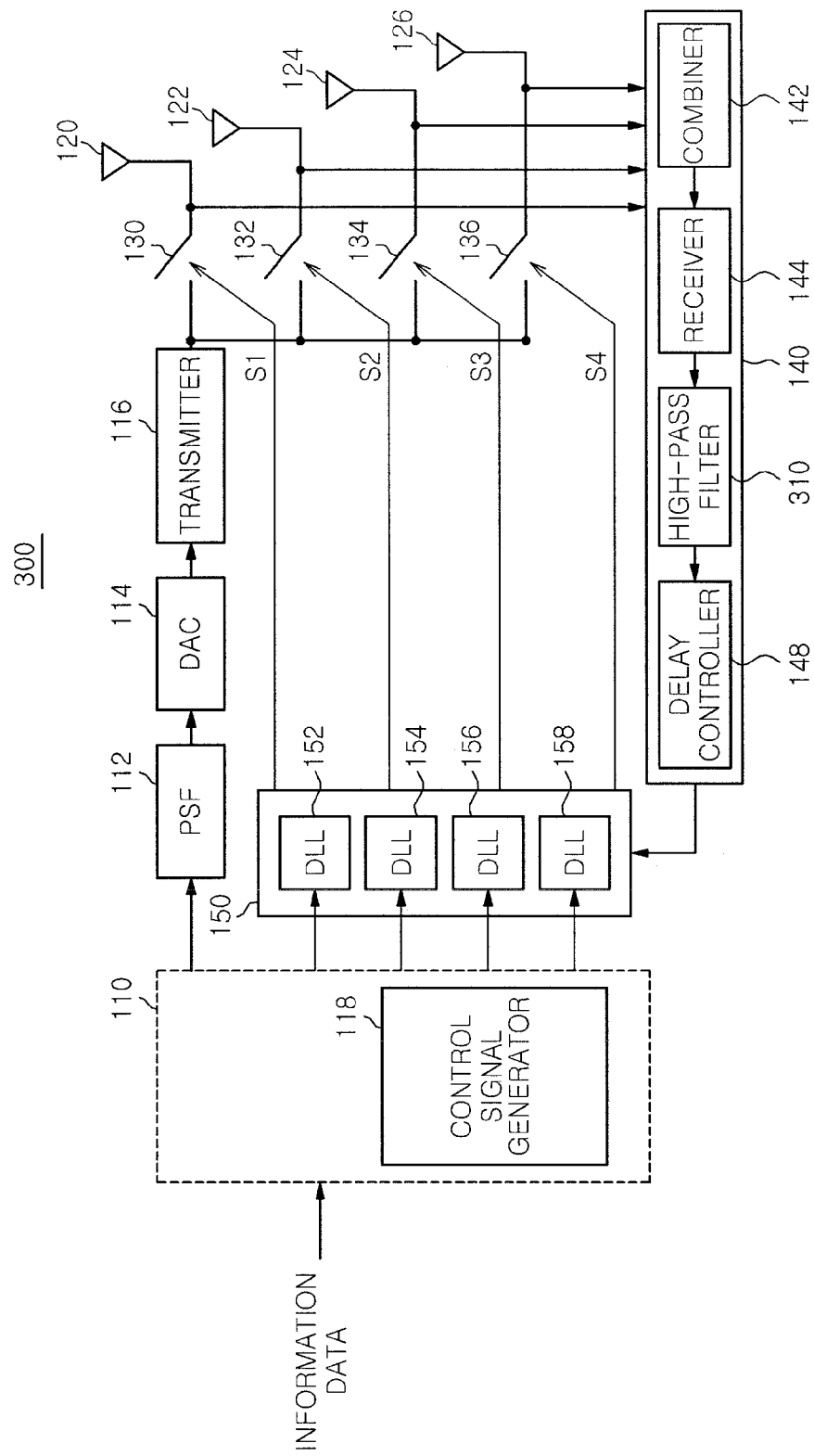
FIG. 3 is a circuit diagram illustrating a transmission apparatus based on spatial modulation in accordance with another embodiment of the present invention.

When an input signal of the delay controller 148 is a baseband signal, as illustrated in FIG. 3, the delay analyzer 140 uses a high-pass filter 310 instead of the notch filter. Here, FIG. 3 shows a transmission apparatus 300, i.e., a detailed circuit diagram for synchronization using a quadrature chain baseband scheme, and elements thereof other than a filter are the same as FIG. 1.

Moreover, when a baseband signal is used, a quadrature signal of an I-channel signal and a Q-channel signal is necessary so as to be independent of a phase error between a transmission carrier signal and a reception carrier signal. The delay adjuster 150 may adjust the delay times of the respective switching control signals according to the delay information supplied from the delay controller 148 of the delay analyzer 140, and supply the adjusted delay times to the respective switches 130, 132, 134 and 136.

The delay adjuster 150 may be configured with a plurality of delay lock loops (hereinafter referred to as "DLL") 152, 154, 156 and 158 respectively connected to the switches 130, 132, 134 and 136. That is, the DLLs 152, 154, 156 and 158 may delay the switching control signals according to the delay times and output the delayed switching control signals to the switches 130, 132, 134 and 136, respectively.

An operation of the transmission apparatus 100 having the above-description configuration will now be described in detail.

First, the delay analyzer 140 receives transmission signals output from the respective switches 130, 132, 134 and 136, and the combiner 142 of the delay analyzer 140 combines transmission signals output from the respective switches 130, 132, 134 and 136 to supply the combined transmission signal to the receiver 144.

The receiver 144 down-converts the combined transmission signal into an IF band signal, and supplies the IF band signal to the notch filter 146. The notch filter 146 removes signals other than a noise signal from the down-converted signal, and supplies the noise signal to the delay controller 148.

The delay controller 148 analyzes the delay information on the switching control signals to be applied to the respective switches 130, 132, 134 and 136 on the basis of an amplitude of the noise signal, namely, adjusts the switching control signals to be applied to the respective switches 130, 132, 134 and 136 depending on various cases, thereby detecting delay information on a switching control signal whose noise amplitude is minimized. The detected delay information is transferred to the delay adjuster 150. The delay adjuster 150 controls the DLLs 152, 154, 156 and 158 that apply the switching control signals to the respective switches 130, 132, 134 and 136 to adjust synchronization between the switches 130, 132, 134 and 136, on the basis of the delay information supplied from the delay controller 148. Here, the switching control signals generated by the control signal generator 118 are applied to the DLLs 152, 154, 156 and 158 of the delay adjuster 150, respectively.

In an embodiment of the present invention, it has been described above as an example that the delay controller 148 uses the IF band signal, but the baseband signal may be used. When the baseband signal is used, as illustrated in FIG. 3, the high-pass filter 310 instead of the notch filter 146 shown in FIG. 1 is necessary. Further, the quadrature signal of the I-channel signal and Q-channel signal is necessary to be independent of the phase error between the transmission carrier signal and the reception carrier signal.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An antenna switching apparatus based on spatial modulation, the antenna switching apparatus comprising:
 a plurality of antennas;
 a control signal generator configured to generate a plurality of switching control signals;
 a plurality of switches installed at respective front stages of the plurality of antennas, and configured to switch on to apply a transmission signal to the respective antennas according to the respective switching control signals;
 a delay analyzer configured to receive the transmission signal output from each of the plurality of switches to calculate delay information for synchronizing the switching control signals applied to the respective switches; and
 a delay adjuster configured to synchronize the switching control signals to apply the synchronized switching control signals to the respective switches according to the calculated delay information.

2. The antenna switching apparatus of claim 1, wherein the delay analyzer comprises:
 a combiner configured to combine the transmission signals output from the respective switches;
 a receiver configured to down-converter the combined transmission signal;
 a filter configured to extract only a noise signal from the down-converted signal; and
 a delay controller configured to calculate delay information on the basis of the noise signal output from the filter, and supply the delay information to the delay adjuster.

3. The antenna switching apparatus of claim 2, wherein the receiver converts the combined transmission signal into an IF band signal, and supplies the IF band signal to the filter.

4. The antenna switching apparatus of claim 3, wherein the filter is a notch filter.

5. The antenna switching apparatus of claim 2, wherein the receiver converts the combined transmission signal into a baseband signal, and supplies the baseband signal to the filter.

6. The antenna switching apparatus of claim 5, wherein the filter is a high-pass filter.

7. The antenna switching apparatus of claim 2, wherein the delay adjuster comprises a plurality of delay lock loops (DLLs) connected to the respective switches, and configured to adjust delay of the switching control signals to be input to the respective switches according to the delay information.

8. An antenna switching apparatus based on spatial modulation, the antenna switching apparatus comprising:
 a delay analyzer configured to receive a transmission signal output from each of a plurality of switches connected to a plurality of antennas to calculate delay information for synchronizing switching control signals applied to the respective switches of the plurality of switches, the delay analyzer further comprising:
 a combiner configured to combine the transmission signals output from the respective switches;
 a receiver configured to down-convert the combined transmission signal;
 a filter configured to extract only a noise signal from the down-converted signal; and
 a delay controller configured to calculate delay information on the basis of the noise signal output from the filter; and
 a delay adjuster configured to synchronize the switching control signals and apply the synchronized switching control signals to the respective switches according to the calculated delay information.

9. The antenna switching apparatus of claim 8, wherein the receiver converts the combined transmission signal into an IF band signal, and supplies the IF band signal to the filter.

10. The antenna switching apparatus of claim 8, wherein the filter is a notch filter.

11. The antenna switching apparatus of claim 8, wherein the receiver converts the combined transmission signal into a baseband signal, and supplies the baseband signal to the filter.

12. The antenna switching apparatus of claim 11, wherein the filter is a high-pass filter.

13. The antenna switching apparatus of claim 8, wherein the delay adjuster comprises a plurality of delay lock loops (DLLs) connected to the respective switches, and configured to adjust delay of the switching control signals to be input to the respective switches according to the delay information.

14. An antenna switching apparatus based on spatial modulation, the antenna switching apparatus comprising:
 a plurality of antennas;
 a control signal generator configured to generate a plurality of switching control signals;
 a plurality of switches installed at respective front stages of the plurality of antennas, and configured to switch on to apply a transmission signal to the respective antennas according to the respective switching control signals; and
 a delay analyzer configured to receive the transmission signal output from each of the plurality of switches to calculate delay information for synchronizing the switching control signals applied to the respective switches, wherein
 the delay analyzer comprises:
 a combiner configured to combine the transmission signals output from the respective switches;
 a receiver configured to down-converter the combined transmission signal;
 a filter configured to extract only a noise signal from the down-converted signal; and
 a delay controller configured to calculate delay information on the basis of the noise signal output from the filter, and supply the delay information to the delay adjuster.

* * * * *